Aug. 24, 1937.  A. B. KEMPEL  2,090,681
WIPER BLADE
Filed Aug. 14, 1936
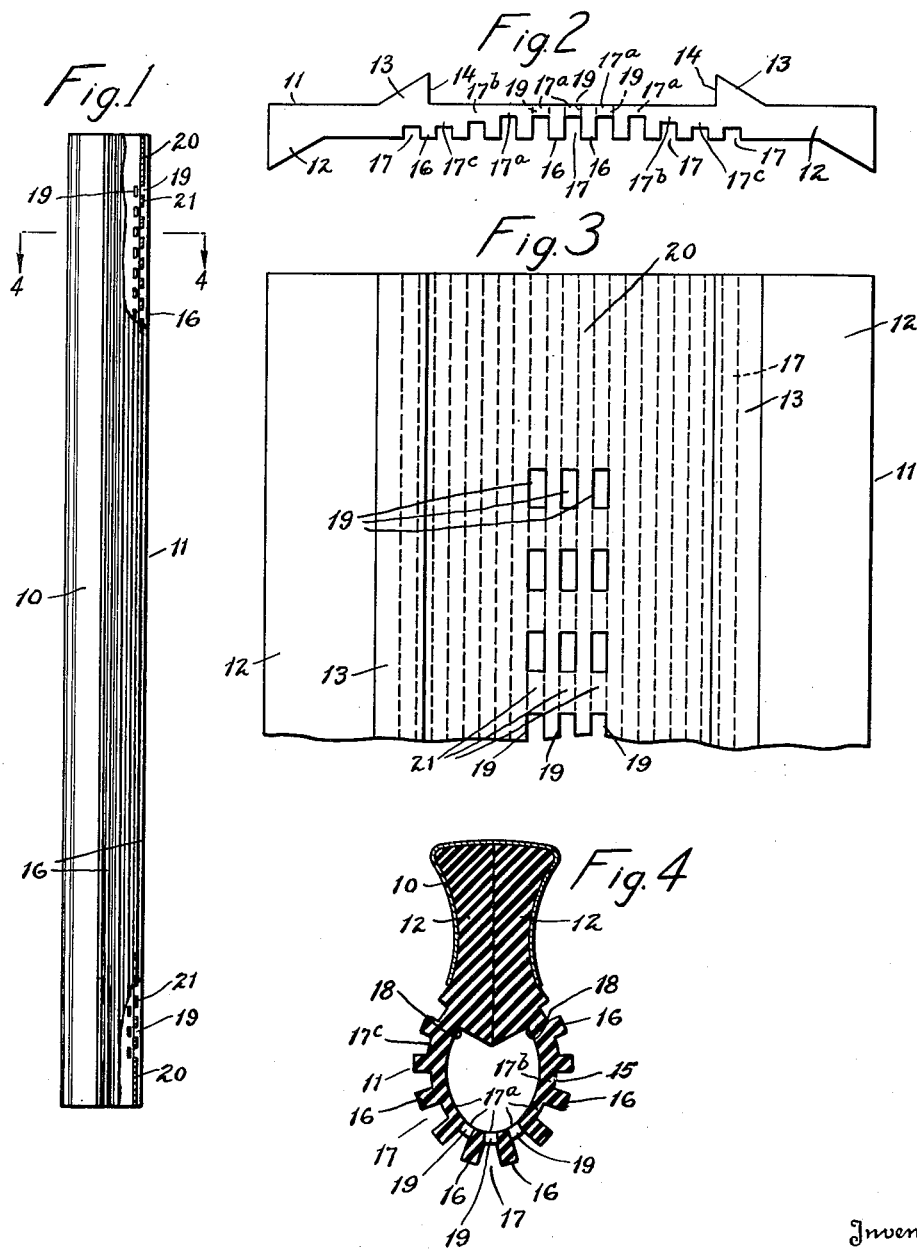

Patented Aug. 24, 1937

2,090,681

UNITED STATES PATENT OFFICE 2,090,681

WIPER BLADE

Arthur B. Kempel, East Brady, Pa., assignor, by mesne assignments, to Raymond A. Rodrick, Akron, Ohio Application August 14, 1936, Serial No. 96,064

1 Claim. (Cl. 15—245)

This invention relates to squeegees or cleaner blades for windshields etc., of the type including a hollow, flexible, rubber cleaner element which may be formed with longitudinal wiping ribs.

My principal object is to increase the durability of the rubber element in such devices. In the prevailing form of this type of cleaner, there is a channel-shaped metal blade back or holder, and the rubber element is a strip bent into tubular form and having thickened marginal anchoring portions which are brought together and held in the metal channel. The comparatively thin wall of the intermediate flexing portion has heretofore been made of substantially uniform thickness throughout its width. This produced a rather sharp bending or hinging action at the edges of said flexing portion where it joins the thickened marginal portions, as the blade is moved back and forth over the glass, and ultimately, in many instances, the rubber would split longitudinally at these places and ruin the blade or decrease its efficiency. That objection is remedied by the present invention.

Of the accompanying drawing, Fig. 1 is a vertical side elevation showing a preferred form of wiper blade embodying my invention.

Fig. 2 is an enlarged end view of the rubber element extended in the flat form in which it is molded.

Fig. 3 is a back plan view of one end of said extended rubber element on the same scale as Fig. 2.

Fig. 4 is an enlarged cross-section on the line 4—4 of Fig. 1.

The particular wiper here illustrated is perforated in the tread or wiping portion of its rubber element in order to drain the grooves thereof partly through the interior of said element, and to supply upon the glass an anti-freeze substance from the interior through the perforations in freezing or sleety weather, but the invention also applies to non-perforated tubular or hollow wipers.

In the drawing, 10 is the channel-shaped back or holder of the cleaner blade, made of sheet metal and with its side portions inclined toward each other and outwardly flared at their edges to grip the anchoring portions of the rubber element. Said holder may be provided with any suitable form of rearwardly projecting clip or coupling member, not here illustrated, for attaching it to the wiper arm mounted on the windshield, or may be otherwise adapted for connection with such an arm.

11 is the rubber wiping element, which is molded in a laterally-extended flat form as illustrated in Figs. 2 and 3, and adapted to be bent into tubular form and assembled with the holder as shown in Figs. 1 and 4. Said strip is provided with thickened marginal anchoring portions 12, somewhat wedge-shaped in section, for reception between the sides of the holder 10, in which they are held under a slight compression, and on the back it is formed with a pair of wedge-shaped ribs 13 overlapping said thickened portions and inwardly terminating in abrupt shoulders 14 between the anchoring portions and the flexible middle portion of the rubber element, said ribs meeting to define the fixed portion of the tube wall on the holder side and to aid in maintaining the compression of the anchoring portions. The intermediate part 15 of the rubber element, between the shoulders 14, constitutes the flexing portion of said element.

On the side of the strip 11 which is to form its acting face, it is molded with a series of parallel longitudinal ribs 16 extending for the full length of said strip and flanked by separating grooves 17, the two marginal ones of which underlie the wedge-shaped ribs 13. In accordance with my invention, the wall of the flexing portion 15, forming the bottom wall portions of the grooves 17, is graduated or substantially tapered in cross section, from a greater thickness at the margins of said flexing portion, to a smaller thickness at the middle thereof, in order to distribute the bending or hinge action at the margins, resulting from the back-and-forth movement of the wiper across the windshield glass, instead of concentrating it at the corners 18, as happens when this flexing wall is made of uniform thickness throughout.

Since the thickness at the ribs is uniform, this graduation makes the ribs 16 of varying height and the grooves 17 of different depths, the one or ones in the middle being the deepest. The five middle grooves, for example, may be of uniform depth and their bottom walls 17a of the minimum thickness such as .02", the next one on each side of shallower depth and its bottom wall 17b of a greater thickness such as .03", the next or last but one on each side of still shallower depth and its bottom wall 17c of a still greater thickness such as .04", and the last groove on each side of the same depth as its neighbor. Thus the illustration shows ten full ribs 16 and eleven grooves 17, covering the full width of the flexing portion 15 and having the described graduation of wall thickness, but it will be understood that a greater or less number of ribs and grooves may be provided, and only two of said ribs 16 in the illustrated arrangement, or four at the most, are generally active in the wiping operation. A ribbing of the entire exposed outer surface provides a desirable combination of flexibility and durability of said exposed portion, and it has been found that the described graduation of wall thickness prevents the cracking or splitting of the wall margins heretofore experienced at the corners 18.

The rubber element is further shown as provided with a multiplicity of perforations 19, which may be in one or more longitudinal rows, three in this instance, located at the bottom of the middle groove or grooves 17. A considerable middle length of the strip wall at each end, for about ⅜", is left unperforated as indicated at 20, to resist the twisting effect where said end portions may overlap the windshield frame at the ends of the blade stroke. It has been found desirable to make the solid rubber partitions or struts 21 between adjacent perforations 19 of a certain minimum length, such as approximately two millimeters, to avoid breaking of said struts. These perforations serve to drain the grooves 17 partly through the hollow interior of the wiper and out through the end thereof during a heavy rainfall, and thus to decrease the thickness of the water film between the glass and the active ribs. The effect of confining the perforations 19 substantially to those groove bottoms adjacent to the active ribs 16 is to promote a flattening and greater flexibility of the tread wall, and thus to enhance the described effect of thickening the adjacent marginal portions of the flexing wall in preventing an objectionable hinging action at the corners 18.

It will be understood that the described form of embodiment may be more or less varied without departing from the scope of my invention as defined in the claim.

I claim:

A windshield wiper blade comprising a holder, and a hollow rubber wiping element having marginal anchoring portions mounted in said holder and an intermediate flexing portion, the latter being longitudinally ribbed and perforated adjacent the ribs, in the glass-contacting middle portion thereof, and longitudinally ribbed and substantially unperforated in its marginal portions, and being graduated from a maximum wall thickness in said marginal portions adjacent to the holder to a minimum thickness in said middle perforated portion.

ARTHUR B. KEMPEL.